Patented Jan. 15, 1935

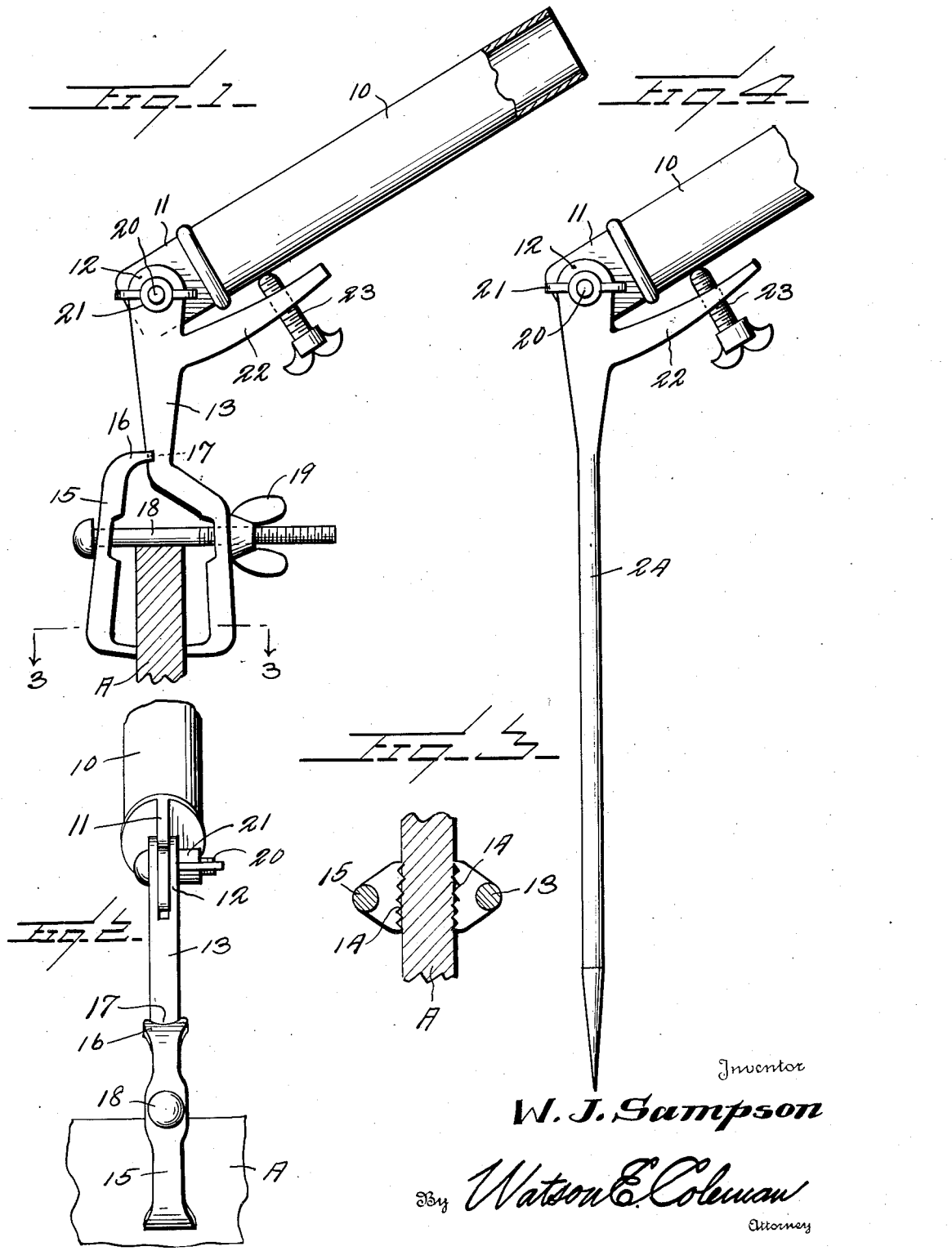

1,987,842

UNITED STATES PATENT OFFICE 1,987,842

FISHING POLE SUPPORT

Willie J. Sampson, Denison, Tex.

Application August 31, 1933, Serial No. 687,701

1 Claim. (Cl. 24—243)

This invention relates to devices for supporting fishing poles while fishing and the general object of the invention is to provide a very simple means whereby a pole may be supported at any desired angle either upon the bank of a stream or upon a boat.

A further object is to provide means whereby the socket for the pole may be adjusted in different angular relations to the support.

My invention is illustrated in the accompanying drawing, wherein:—

Figure 1 is a side elevation of one form of my invention clamped upon the thwart of a boat;

Figure 2 is a rear elevation thereof;

Figure 3 is a section on the line 3—3 of Figure 1;

Figure 4 is a side elevation of a modified form of my device for use on the bank of a stream.

Referring to the drawing, and particularly to Figure 1, 10 designates a socket adapted to receive a fishing rod or a pole, the socket being hollow. At the lower end of the socket, there is disposed the lug 11 adapted to be received within the bifurcation 12 of a clamping member whose shank is designated 13. This clamping member at its lower end is angularly bent outward, then extends downward and then inward and is provided with the teeth 14 as shown in Figure 3.

Coacting with the clamping member 13 is a second clamping member 15 having an inwardly extending upper end 16 which is curved at 17 to fit partially around the clamp element 13. The lower end of the clamping member 15 is also angularly extended inward and provided with the teeth 14 as shown in Figure 3. Extending through the clamping members 13 and 15 is a bolt 18 headed at one end and screw-threaded at the other end for the reception of a wing nut 19. Obviously when this wing nut is turned up clamping members will be drawn against the thwart A and will bind thereon very firmly. The lug 11 is held to the bifurcated upper end of the clamp 13 by means of the bolt 20 provided with the wing nut 21. The thwarts of a boat usually extend outward and upward and make it difficult to support the socket at the proper angle as the upward and outward angle of the thwarts of different boats vary. Hence I have provided the outwardly projecting rigid arm or lug 22 extending beneath the socket 10 and provided with the adjusting screw 23 whereby the socket may be raised or lowered to any desired angle. This construction permits the hole to be pulled upward in case of a strike and the fish to be swung over into the boat but prevents the downward movement of the socket beyond a predetermined point.

In Figure 4, I have illustrated a modification of the fishing pole support which is particularly adapted for use on the bank of a stream. In this case a spike 24 is provided adapted to be driven into the ground, the spike at its upper end being bifurcated in the same manner as the clamp 13. The socket 10 is formed as before with the lug 11 which is received within the bifurcated end of the spike 24 and is held thereto by the bolt 20 all as previously described.

The upper end of the spike 24 has a laterally extending arm 22 as previously described through which the screw 23 passes for the purpose of adjusting the angle of the socket 10.

It will be seen that the spike 24 and the clamping member 13 are interchangeable so that the same socket may be used either for shore fishing or for boat fishing.

I claim:—

A clamp for a fishing pole including two clamping members, one of them providing a shank, one end portion of the shank being outwardly bent at an angle to the shank and then extending approximately parallel to the shank and then being inwardly extended and formed with teeth, the second clamping member co-acting with the first clamping member and having inwardly bent portions at its ends, one of these inwardly bent portions having teeth and confronting the inwardly bent portion on the other member, the other inwardly extending portion of the second named clamping member being concavely curved to partially embrace the shank, and a bolt passing loosely through both of said clamping members, having a head at one end and having a nut at the other end.

WILLIE J. SAMPSON.